Oct. 16, 1962 V. CHANARYN ETAL 3,058,766
RELEASABLE FASTENING DEVICES
Filed July 17, 1959 2 Sheets-Sheet 1

INVENTORS
VICTOR CHANARYN
PHILIP SWINGEWOOD JEAVONS
PAUL ROBERT PICKARD
By Irwin S. Thompson
ATTORNEY Oct. 16, 1962 V. CHANARYN ETAL 3,058,766
RELEASABLE FASTENING DEVICES
Filed July 17, 1959 2 Sheets-Sheet 2

INVENTORS
VICTOR CHANARYN
PHILIP SWINGEWOOD JEAVONS
PAUL ROBERT PICKARD
By Irwin S. Thompson
ATTORNEY United States Patent Office 3,058,766
Patented Oct. 16, 1962

3,058,766
RELEASABLE FASTENING DEVICES
Victor Chanaryn, Solihull, Philip Swingewood Jeavons, Birmingham, and Paul Robert Pickard, Shirley, Solihull, England, assignors to Wilmot-Breeden Limited, Birmingham, England
Filed July 17, 1959, Ser. No. 827,966
Claims priority, application Great Britain Feb. 7, 1959
18 Claims. (Cl. 292—336)

This invention relates to releasable fastening devices, more especially for doors, of the type comprising two parts between which relative translatory and angular movement occurs during the fastening operation to bring the parts into a relative coupling position.

Hitherto it has been customary for the two parts of such fastening devices to engage during their relative translatory movement prior to taking up said relative coupling position and for the relative angular movement to result directly from such engagement. This complicates the formation of the parts, which require contact surfaces additional to those which engage when the parts are coupled, and tends to increase the overall width of the fastening devices in the direction of said relative translatory movement. This latter width is of great importance in the case of vehicle door fastenings as with many vehicles there is a trend towards narrower door and body pillars.

The object of the invention is to provide a fastening device of the above type in which said relative angular movement is not caused by initial contact engagement of the parts, and which as a result can readily be of relatively narrow width in the direction of relative translatory movement.

According to the invention a releasable fastening device comprises two parts between which relative translatory and angular movement occurs during the fastening operation and a member which is displaced as a result of said relative translatory movement independently of contact engagement of the parts to cause said relative angular movement whereby the parts are brought to a relative coupling position.

Preferably one of the parts is rotatably mounted about an axis fixed relatively to said member and undergoes translatory movement with the latter relatively to the other part which remains fixed in the angular sense during the fastening operation. This other part may itself engage and displace said member during the fastening operation.

The rotatably mounted part is preferably of cam form while the other part forms a keeper therefor and, as with the releasable fastening devices described in Patent No. 3,002,369, the parts preferably have coacting surface portions the evolution of which is such that said relative angular movement is irreversible by relative translatory movement between the parts in the reverse direction, when the parts have reached said relative coupling position, due to the reaction force between the parts as a result of any tendency for such reverse relative translatory movement generating a condition of substantially no-moment about said axis of angular movement. Additionally, as with the releasable fastening devices described in Patent No. 3,002,778, said reaction force may conveniently be substantially aligned with the direction of said relative translatory movement.

The rotatably mounted part may be positively turned against a spring or other bias by external release means in the uncoupling direction to release the fastening, and detent means are preferably provided to retain this part "cocked" in an uncoupled angular position which allows relative withdrawal and subsequent re-engagement of the parts. With this construction said member acts as a trigger member, its displacement during said relative translatory movement acting to release the detent means whereupon the rotatably mounted part is turned by the spring bias towards its coupling position. Although release of the detent means does not depend upon initial contact engagement of the parts, the arrangement may be such that initial engagement occurs and serves to produce a small degree of relative angular movement of the parts in the uncoupling direction. This tends to free the detent means so that their release requires a smaller loading of the trigger member.

When the parts are so constructed that the reaction force between them as a result of any tendency for reverse relative translatory movement generates a condition of substantially no-moment about said axis of angular movement, one of the parts may form a simple keeper as described in our co-pending patent application Serial No. 3,331.

The arrangement may be such that the relative angular movement does not occur until substantially the end of the effective portion of the relative translatory movement, i.e. just before commencement of any overtravel of the parts during the fastening operation. Alternatively, the relative angular movement may occur during said effective portion of the relative translatory movement so that early engagement of the parts does occur somewhat before they reach their relative coupling position.

Such early engagement may initially serve to bring a further surface portion of the rotatably mounted part into a coupling position relatively to said surface portion of the other part to obtain a condition of "safety lock" which can occur if a door with which the device is used is slammed with insufficient force to effect complete engagement of the parts.

If desired, initial engagement of the parts may serve to turn the rotatably mounted part a small distance in the uncoupling direction until the parts reach a relative position where the spring bias turns the rotatably mounted part back to its normal cocked position to bring the parts to the safety lock position. With such an arrangement the detent means do not have to be operated to achieve safety lock and the construction may be such that no displacement of the trigger member occurs until after the safety lock position is passed.

The rotatably mounted part is preferably a substantially sector-shaped cam offset from its rotational axis and having a cam face which enters into initial engagement with the other part and an adjacent abutment face which enters into coupling engagement with the latter when the parts reach said relative coupling position.

The invention will now be further described with reference to the accompanying drawings which illustrate, by way of example, two forms of motor vehicle door fastenings in accordance with the invention, and in which:

FIGURES 1 and 2 diagrammatically illustrate progressive stages by which an angularly movable part of the simpler of the two fastenings engages with a stationary part during closing movement of the vehicle door, FIGURE 3 is a front view generally similar to that of FIGURES 1 and 2 but also illustrating manual releasing means of the fastening.

Figure 1:
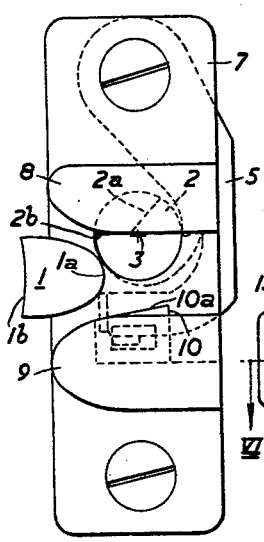
Figure 2:
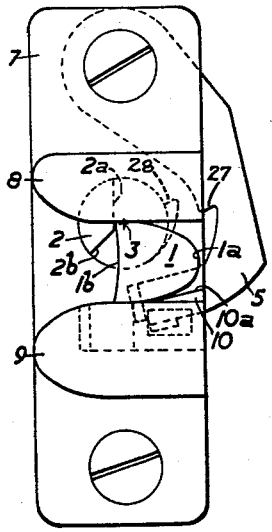
Figure 7:
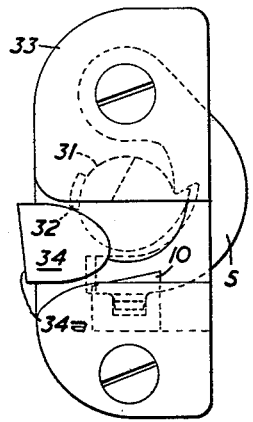
Figure 8:
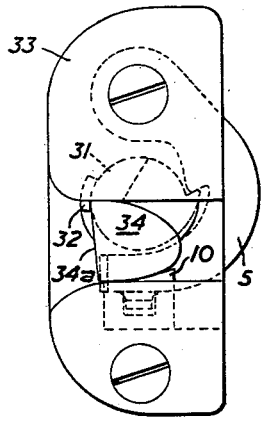
Figure 9:
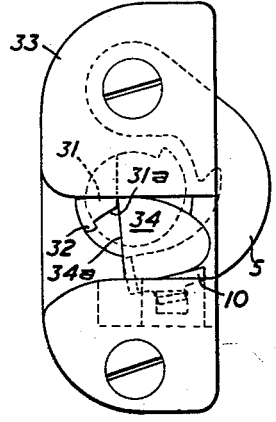

FIGURES 7 to 9 indicate in a manner similar to FIGURES 1 and 2 progressive stages of engagement during closing movement of the vehicle door with the other of the two fastenings.

Referring to FIGURES 1 and 2 of the drawings, the fastening device diagrammatically illustrated therein comprises the stationary part or striker 1 in the form of a block having a round outer end 1a and an inner end 1b which is shallowly recessed to provide projecting but radiused corners at its upper and lower edges, and the angularly movable part providing a catch or cam 2. As fitted to a vehicle, the striker 1 is fixed to a body pillar of the vehicle and the cam 2 is carried by the corresponding door pillar. The cam 2 is angularly movable about a centre 3, fixed in relation to the body pillar, and is of segmental shape offset from the centre 3, the segmental shape providing an abutment face 2a which in the coupled position, as shown in FIGURE 2, enters into latching engagement with the striker 1.

Figure 5:
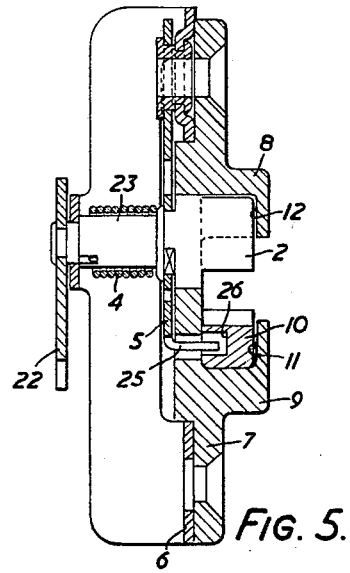
FIGURE 5 is a cross-sectional view on the line V—V in FIGURE 4.

The striker 1 and cam 2 are mounted on the body and door pillars respectively so that the parts are arranged as illustrated in FIGURES 1 and 2, the cam being movable between a cocked uncoupled angular position, as shown in FIGURE 1, to its coupled position as shown in FIGURE 2 in which the abutment face 2a is disposed substantially vertically. The cam 2 is spring loaded towards its coupled position by a helical torsion spring 4, see FIGURES 5 and 6, and is retained in the cocked position against the spring by detent means comprising a detent or retaining lever 5 the operation of which will be described in greater detail hereinafter.

The body part of the fastening, i.e. the main section thereof which is mounted on the door and comprises the cam 2, includes a backplate 6 in which the cam 2 is rotatably mounted. The lever 5 is pivotally mounted about a centre 5a on the rear or inner side of the backplate 6 to which is attached by means of screws a dovetail moulding portion 7 formed in a plastic such as nylon. The moulding 7 has on its outer side a pair of spaced outwardly extending lugs or guide sections 8 and 9 between which is defined a substantially horizontal guide channel adapted to receive the striker 1 and to provide vertical guidance for the latter during its engagement with the cam 2.

The presented or facing surfaces of the sections 8 and 9 are shaped at their leading ends to provide a bell-mouthed entrance to said guide channel so that any slight vertical misalignment of the door will be corrected as the striker 1 is guided into the channel prior to its engagement with the cam 2. A spring-loaded wedge piece 10 forming a trigger member is mounted in a recess 11 in the presented surface of the lower guide section 9, and this wedge has an inclined wedging face 10a which protrudes into said guide channel for contact with the striker 1 during the fastening operation.

The wedge 10 is slidable in the recess 11 against its spring loading, and the arrangement is such that during closing of the door engagement between the striker 1 and the wedge 10 moves the latter against the action of its spring. The detent lever 5 is permanently engaged as later described at its free end with the wedge 10, and movement of the wedge 10 by the striker 1 during the fastening operation serves to swing the lever 5 to a position in which the cam 2 is released.

FIGURE 1 illustrates the striker 1 and cam 2 disengaged from each other with the cam approaching the striker as the door moves towards its closed position. Upon further inward movement of the door pillar the striker 1 engages the wedging face 10a of the wedge 10 and displacement of the latter acts to release the detent means, so that as the striker 1 reaches the coupled position shown in FIGURE 2 the cam 2 is turned by the spring 4 to its coupling position.

The cam 2 is housed within a recess 12 in the presented surface of the upper guide section 8 which in effect acts as a shroud for the cam. In the uncoupled position of the cam 2, as shown in FIGURE 1, the lower or cam face 2b of the cam 2 is substantially aligned with but projects slightly below the upper edge of said guide channel and in the coupled position, as shown in FIGURE 2, the cam has turned so that its abutment face 2a is disposed substantially vertically in engagement with the rear face 1b of the striker 1. In the coupled position engagement of the striker 1 with the wedging face 10a serves to wedge the striker between the wedge 10 and the presented face of the guide section 8, and such wedging produces vertical restraint for the door when closed.

As the striker 1 enters the guide channel it first makes contact with the projecting cam face 2b of the cam 2, and as a result imparts a small angular movement to the latter against the action of the spring 4. The effect of this movement is to relieve frictional pressure on the detent means to facilitate release of the latter by displacement of the wedge 10.

As a result of the described formation of the coacting surface portions of the striker 1 and cam 2, the angular movement of the cam to its coupled position is irreversible by opening movement of the door when the parts have reached the relative coupling position. This results from the reaction force between the parts resulting from any tendency for opening movement of the door generating a condition of substantially no-moment about the centre of rotation 3 of the cam 2. In addition, the vertical arrangement of the abutment face 2a when the cam 2 is in its coupling position results in said reaction force being substantially aligned with the direction of translatory movement of the cam 2 during the fastening operation.

Figure 3:
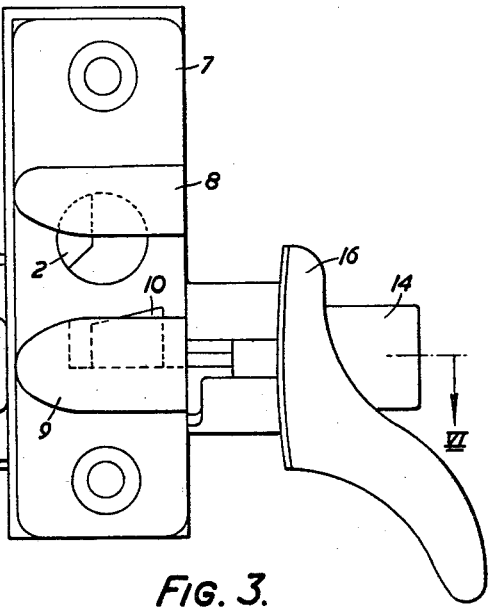
Figure 6:
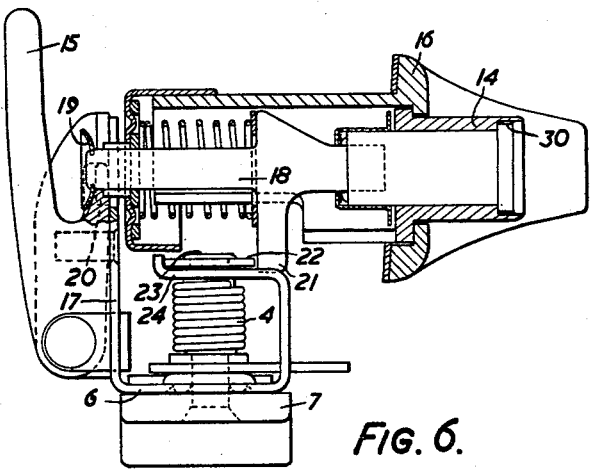
FIGURE 6 is a cross-sectional view along the line VI—VI in FIGURE 3.

Referring particularly to FIGURES 3 and 6, external release means, by which the cam 2 can be positively turned against the bias of the spring 4 in the uncoupling direction to release the fastening, comprise a push-pull arrangement provided by a pushbutton 14 arranged for mounting externally of the door and a lever-type handle 15 arranged for mounting inside the door. The pushbutton 14 is mounted in a housing 16 which also forms the external door handle and is mounted on a bent-up portion 17 of the backplate 6. The pushbutton stem 18 is provided at its inner end with a dished washer 19 which engages on the inner side of an integral arm 20 of the handle 15.

The pushbutton stem 18 has a laterally extending projection or abutment piece 21 which engages an actuating arm or contactor 22 when the pushbutton 14 is depressed. This actuating arm 22 is fixed on the inner end of a spindle 23 of the cam 2 around which the spring 4 is arranged, and adjacent said inner end the spindle 23 is situated in an outrigger bearing plate 24. Inward movement of the pushbutton stem 18 either by the pushbutton 14 or the inner handle 15 causes the projection 21 to engage the arm 22 and rotate the cam 2 from the coupled position shown in FIGURE 2 to the uncoupled or cocked position shown in FIGURE 1. On opening movement of the door the wedge 10 initially moves outwardly with the striker 1 relatively to the backplate 6 to the limit of its travel, taking with it the lever 5 which is coupled to the wedge 10 by means of an integral lateral tongue 25 which projects through the moulding 7 into a recess 26 formed in the inwardly facing side of the wedge 10. The tongue 25 is of such size in relation to the recess 26 that it is prevented from movement relatively to the wedge 10 in a direction parallel to said guide channel but has some freedom of movement in a vertical direction to ensure that the wedge 10 can always maintain sliding contact with the base of the recess 11.

Figure 4:
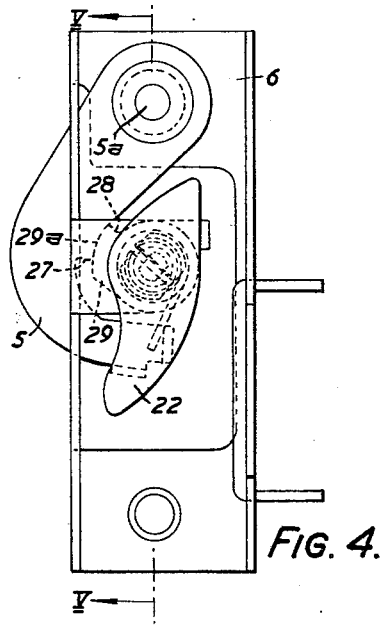
FIGURE 4 is a rear detail view illustrating internal elements of the fastening.

Movement of the lever 5 with the wedge 10 brings a notch 27 in the inner edge of the lever 5, see FIGURE 4, into engagement behind a projecting pawl-like shoulder 28 on a cam plate 29 fixed on the cam spindle 23 immediately behind the portion 7. In FIGURES 3 and 4 the various elements of the fastening are respectively shown in the positions which they occupy when the door is closed with the lever 5 in idling engagement with an arcuate cam face 29a of the cam plate 29.

During initial opening movement of the door, after the cam 2 has been turned to its uncoupled position, the lower flat face of the cam rests on the upper surface of the striker 1 so that the cam is retained in its uncoupled position until the notch 27 of the lever 5 enters into engagement with the cam plate 29 whereby to retain the cam 2 cocked during further opening movement of the door.

The pushbutton 14 is bored through and counterbored at 30 at its outer end for mounting a key operable lock which is not illustrated, and operation of this lock acts to turn the pushbutton stem 18 and with it the projection 21 so that the latter does not engage the actuating arm 22 on depression of the pushbutton. Thus the pushbutton "free-wheels" and the door cannot be opened from outside the vehicle until the key is again used to turn the pushbutton stem 18 back to its operative position.

The fastening illustrated in FIGURES 7 to 9 embodies a detent lever 5 and other internal elements substantially identical with those of the fastening already described, and differs mainly with regard to the formation of the cam 31, the backplate 33 and the striker 34. The backplate 33 is of pressed metal construction and is formed integrally with guide sections which provide a horizontal guide channel as before and which again respectively act partially to shroud the cam 31 and the sliding wedge 10.

At its leading edge the lower cam face 31a of the cam 31 is extended or stepped at 32 to provide an outwardly directed shoulder which engages the rear face 34a of the striker 34 to provide a condition of "safety lock" which can occur if the door is slammed with insufficient force to effect complete engagement of the parts. Initial engagement of the cam 31 and striker 34 serves to turn the cam a small distance in the uncoupling direction as the step 32 of the cam rides over the upper surface of the striker 34 until the cam and striker reach a relative position where the bias of the spring 4 turns the cam 31 back to its normal cocked position which now provides the condition of safety lock as shown in FIGURE 8.

Further inward movement of the door beyond the safety locked position displaces the wedge 10 and with it the lever 5 to release the cam 31, so that ultimately the fully fastened position illustrated in FIGURE 9 is arrived at in a manner similar to that already described in connection with FIGURES 1 and 2.

The striker 34 has a flat rear face 34a, this rear face being inclined to the vertical as shown so that the formation of the upper edge portion which engages with the cam 31 is substantially the same as that of the corresponding portion of the striker 1 which engages with the cam 2.

In both the arrangements illustrated the cam and keeper when in the coupled position, as shown in FIGURES 2 and 9, contact each other substantially at the centre of their relative angular movement, i.e. at the centre of angular movement of the cam.

We claim:

1. A releasable fastening device comprising a first part, a second part adapted for coupling engagement with said first part, relative translatory and angular movement occurring between said parts during a fastening operation, means to produce said relative angular movement, and a spring-loaded wedge member which is associated with said means and provides relative restraint for said parts when coupled in a direction transverse to said relative translatory movement, the arrangement being such that displacement of said wedge member as a result of said relative translatory movement independently of contact engagement of said parts results in said relative angular movement whereby said parts are brought to said relative coupling position.

2. A releasable fastening device comprising a first rotatably mounted part, a second part adapted to remain fixed in the angular sense during a fastening operation in which it enters into coupling engagement with said first part, a spring-loaded wedge member mounted for translatory movement with said first part and arranged to provide relative restraint for said parts when coupled in a direction transverse to the direction of said relative translatory movement, means urging said first part to a coupled angular position and detent means arranged to hold said first part in an uncoupled angular position against said means urging that part to the coupled position, said detent means being released as a result of displacement of said wedge member during the fastening operation to allow relative angular movement of said parts to the coupled position.

3. A releasable fastening device according to claim 2, wherein the arrangement of said wedge member and detent means is such that said relative angular movement does not occur until substantially the end of the effective portion of the relative translatory movement.

4. A releasable fastening device according to claim 2, wherein the rotatably mounted part is of cam form and said second part forms a keeper therefor.

5. A releasable fastening device according to claim 4, wherein the rotatably mounted part is of substantially segmental form offset about its axis of rotation.

6. A releasable fastening device according to claim 4, wherein the parts have coacting surface portions the evolution of which is such that said relative angular movement is irreversible by relative translatory movement between the parts in the reverse direction, when the parts have reached the relative coupling position, due to the reaction force between the parts as the result of any tendency for such reverse relative translatory movement generating a condition of substantially no-moment about the axis of angular movement.

7. A fastening device according to claim 6, wherein said reaction force is substantially aligned with the direction of said relative translatory movement.

8. A releasable fastening device according to claim 6, wherein the parts when in said relative coupling position contact each other substantially at the centre of said angular movement.

9. A releasable fastening device comprising a first part, a second part adapted for coupling engagement with said first part, relative translatory and angular movement occurring between said parts during a fastening operation, resilient means urging said parts to a relative coupled angular position, detent means restraining said parts in a relative uncoupled angular position against the action of said resilient means, and a spring-loaded wedge member which engages one of said parts to provide relative restraint for said parts when coupled in a direction transverse to said relative translatory movement, displacement of said wedge member as a result of said relative translatory movement, during which it engages said one part, acting to release said detent means whereby the parts are brought to the relative coupling position by said resilient means.

10. A releasable fastening device comprising a first rotatably mounted part, a second part adapted to remain fixed in the angular sense during a fastening operation during which it enters into coupling engagement with said first part, a spring-loaded wedge member mounted for translatory movement with said first part and arranged to provide relative restraint for said parts when coupled in a direction transverse to the direction of said relative translatory movement, spring means urging said first part to the coupled angular position, and detent means arranged to hold said first part in an uncoupled angular position and to be released as a result of displacement of said wedge member during the fastening operation.

11. A releasable fastening device according to claim 10, wherein said parts are so formed that initial engagement of the parts serves to produce a small degree of relative angular movement thereof in the uncoupling direction.

12. A releasable fastening device according to claim 10, wherein the arrangement of said wedge member and detent means is such that angular movement of said first part occurs during the effective portion of the relative translatory movement so that early engagement of the parts occurs somewhat before they reach their relative coupling position.

13. A releasable fastening device according to claim 12, wherein said parts are formed for "safety lock" coupling engagement in an intermediate angular position of said first part, and early engagement initially serves to bring said parts into such coupling engagement prior to release of said detent means.

14. A releasable fastening device according to claim 13, wherein said parts are so formed that initial engagement thereof serves to turn said first part a small distance in the uncoupling direction against said spring means until the parts reach a relative position where said spring means are able to turn said first part back to its normal uncoupled angular position which corresponds to said intermediate angular position to bring the parts to the safety lock position.

15. A releasable fastening device according to claim 14, wherein said wedge member is so arranged that displacement thereof does not commence until after the safety lock position is passed.

16. A releasable fastening device comprising a first part, a second part adapted for coupling engagement with said first part and relatively to which is undergoes translatory and angular movement during a fastening operation, guide means providing a guide channel by means of which said parts are guided to a relative coupling position during the fastening operation, a spring-loaded wedge member which provides relative restraint for said parts when coupled in a direction transverse to said relative translatory movement, and means associated with said first part and said wedge member and so arranged that displacement of said wedge member as a result of said relative translatory movement independently of contact engagement of said parts causes said relative angular movement whereby said parts are brought to said relative coupling position.

17. A releasable fastening device according to claim 16, wherein said first part is rotatably mounted about the axis and said guide means are fixed relatively to said axis and undergo translatory movement with said first part.

18. A releasable fastening device according to claim 17, wherein said guide means acts as a partial shroud for the rotatably mounted part.

References Cited in the file of this patent
UNITED STATES PATENTS
2,698,197    Jacobson _____ Dec. 28, 1954